United States Patent [19]
Lin

[11] Patent Number: 6,049,604
[45] Date of Patent: *Apr. 11, 2000

[54] TELEPHONE DIALER HAVING AT LEAST ONE SPEECH SYNTHESIZER PROCESSOR

[75] Inventor: James Lin, Hsin Chu, Taiwan

[73] Assignee: Winbond Electronics Corporation, Taiwan

[ * ] Notice: This patent is subject to a terminal disclaimer.

[21] Appl. No.: 08/880,373

[22] Filed: Jun. 23, 1997

[51] Int. Cl.[7] .................................................. G10L 21/00
[52] U.S. Cl. .......................... 379/355; 379/88; 379/353; 704/275
[58] Field of Search ........................... 379/88, 355, 353; 370/88.1; 455/412; 704/258, 260, 275

[56] References Cited

U.S. PATENT DOCUMENTS

| | | | |
|---|---|---|---|
| 5,208,852 | 5/1993 | Tamura et al. | 379/353 |
| 5,359,598 | 10/1994 | Steagall et al. | 370/58.1 |
| 5,659,663 | 8/1997 | Lin | 704/258 |
| 5,754,602 | 5/1998 | Landry et al. | 379/355 |
| 5,762,731 | 6/1998 | Yablon | 379/88 |
| 5,778,314 | 7/1998 | Sudo et al. | 455/412 |
| 5,825,871 | 10/1998 | Mark | 379/355 |

*Primary Examiner*—David R. Hudspeth
*Assistant Examiner*—Vijay B Chawan
*Attorney, Agent, or Firm*—Proskauer Rose, LLP

[57] ABSTRACT

A method and circuit for generating speech and DTMF tones in a hand-held dialer which includes a memory for storing predetermined speech and tone signal data and a speech processor for selectively retrieving a sequence of the predetermined speech and tone signal data stored in the memory. The selection of the stored data is based on the selections made by the dialer user. The selected data is output through a loudspeaker to dial a selected telephone number and to vocalize a selected message to the user and/or to the dialed party.

22 Claims, 3 Drawing Sheets

TELEPHONE DIALER HAVING AT LEAST ONE SPEECH SYNTHESIZER PROCESSOR

FIELD OF THE INVENTION

The invention relates generally to a hand-held dialing device, and, more particularly, to a pocket telephone dialer having speech and telephone tone capabilities.

BACKGROUND OF THE INVENTION

The basic circuitry of a conventional pocket telephone dialer is shown in FIG. 1. FIG. 1 schematically illustrates a prior art dialer circuit 10 for a Dual Tone Multifrequency (DTMF) telephone which comprises dialer chip 12, crystal 18 and loudspeaker assembly 17. Generally, all DTMF telephone push-button tones ("0–9", "*" and "#") have tone frequencies that are multiples of a base frequency generated by crystal 18. Typically, dialer chip 10 includes a tone generator having a memory (which stores a plurality of telephone numbers that the user has programmed), two frequency multipliers, and a frequency adder (not shown).

To generate each push-button tone, the base frequency is multiplied in one multiplier by a predetermined amount that varies for each of the four keypad rows and the base frequency is multiplied in the other multiplier by a predetermined amount for each of the three keyboard columns. These predetermined amounts are stored in the memory for each row and column. The two multiplied frequency tones are then combined in the adder to produce the DTMF standard tone for each push-button. The combined frequency tone from dialer chip 12 is supplied to loudspeaker assembly 17 which includes a driving transistor 15, having a ground Vs at the emitter and a speaker 14 at the collector.

In operation, the user can recall a pre-programmed telephone number using a predetermined push-button(s), and the like. The tone data of the selected telephone number are outputted from the memory to speaker 14, which is placed over the mouthpiece of the telephone to dial the selected telephone number.

However, it is often desirable to not only output tones representing telephone numbers to place a call, but to also output a speech synthesized message to the user and/or to the receiver of the telephone call. For example, the party's name that the user is calling may be vocalized to confirm that the user is calling the correct party. Further, once the telephone call is connected, a selected synthesized message may be outputted, so that the user need not talk to the called party. This feature is especially useful for users having speech impairments or a limited language vocabulary.

It is therefore an object of the present invention to provide a telephone dialer that is capable of outputting telephone tones and voice messages, as desired.

Another object of the invention is to provide two memory stores, one memory for storing the four keypad row telephone tones and the other memory for storing the three keypad column telephone tones of a DTMF telephone to save storage space.

A further object of the invention is to store background sound is one memory and speech sound in the other memory.

Various other objects, advantages and features of the present invention will become readily apparent from the ensuing detailed description and the novel features which will be particularly pointed out in the appended claims.

SUMMARY OF THE INVENTION

These and other objectives are realized by a method and circuit for generating speech and telephone tone signals in a hand-held dialing device. The inventive dialing device includes a memory for storing predetermined speech and tone signal data and a speech processor for selectively retrieving a sequence of the predetermined speech and tone signal data stored in the memory. The data is selectively retrieved based on the selections of the user of the dialing device and outputted to a loudspeaker coupled internally or externally to the device.

As an aspect of this invention, the device includes a second memory for storing additional predetermined speech and tone signal data and a second speech processor for selectively retrieving a sequence of the stored additional predetermined speech and tone signal data. Preferably, the first memory stores tone signal data representing the four row tones in a DTMF push-button telephone and the second memory stores tone signal data representing the three column tones in the DTMF push-button telephone.

As an additional aspect of this invention, the first memory stores speech signal data representing background sound, such as background music, and the second memory stores speech signal data representing speech sound, such as a voice message.

BRIEF DESCRIPTION OF THE DRAWINGS

The following detailed description, given by way of example and not intended to limit the present invention solely thereto, will best be understood in conjunction with the accompanying drawings in which.

DETAILED DESCRIPTION OF THE INVENTION

Figure 4:
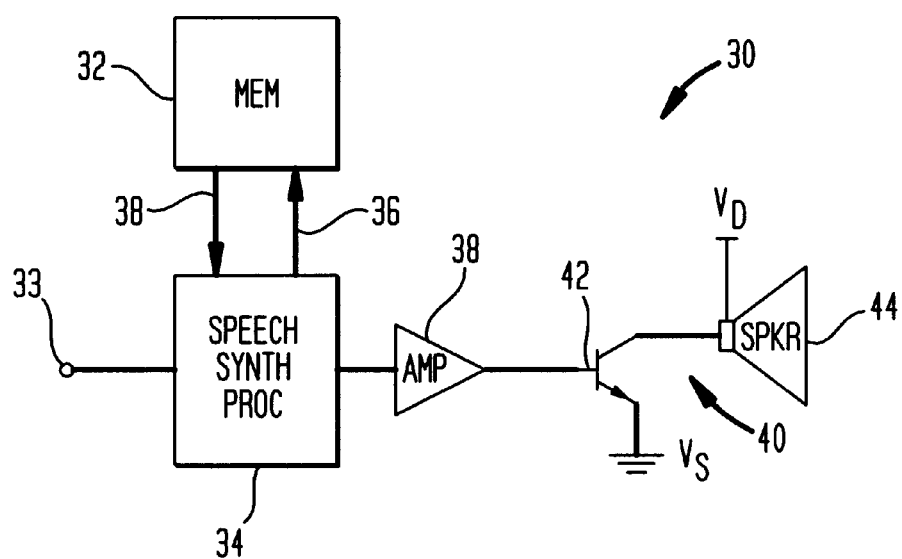
FIG. 4 schematically illustrates a speech and tone synthesizer circuit in accordance with a first embodiment of the present invention.

As shown in FIG. 4, a speech and tone generating device 30 is schematically illustrated in accordance with a first embodiment of the present invention. Device 30 includes an input 33 connected to speech synthesizer processor 34. Based upon the input, processor 34 supplies address signals along line 36 to selectively retrieve speech and telephone tone signal data, stored in the memory 32, and supply the retrieved data to processor 34 along line 38. The retrieved data is then supplied to loudspeaker assembly 40 for output through speaker 44, via amplifier 38 and driving transistor 42.

The speech and tone signal data may be stored as respective speech and tone "sections" in memory 32. For example, the data in speech sections (S1, S2, S3 . . . SN) may represent one of the approximately 250 basic phonic sounds that, when properly combined, can form every word in the English language. Thus, a memory circuit need only store about 250 sounds to be capable of outputting every English word. Alternatively, each speech section may represent a complete word. Whether or not each speech section represents a phonetic sound or a complete word depends on the speech programmer's preference. To combine the speech sections into individual words or phrases, the programmer can rearrange any of the speech sections to form "speech equations", SEq, where each equation may represent a word or a phase of words. For to example, the speech equation SEq=S1+S3+S3+S5+S1+S3 is a phrase or word comprising the sequential concatenation of the speech sections S1, S3, S3, S5, S1 and S3.

Tone sections (T1, T2, T3 . . . T12) may represent divided portions of the twelve DTMF keypad tones. To combine the tone sections into one of the twelve tones, the programmer can rearrange any of the tone sections to form "tone equations", TEq. In other words, each button on the telephone keypad can trigger the corresponding one of twelve tone equations. Typically, each tone equation, representing one of the twelve DTMF tones, is fairly complex and comprises the data from numerous tone sections. Specifically, each of the twelve tones comprises the superimposition of two different frequency tones. The speech synthesizer processor may contain a memory (not shown) therein to store such tone equations.

Figure 1:
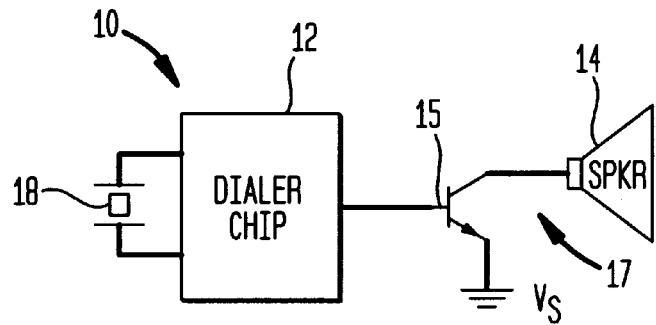
FIG. 1 schematically illustrates the circuitry of a conventional tone generator pocket dialer.
Figure 2:
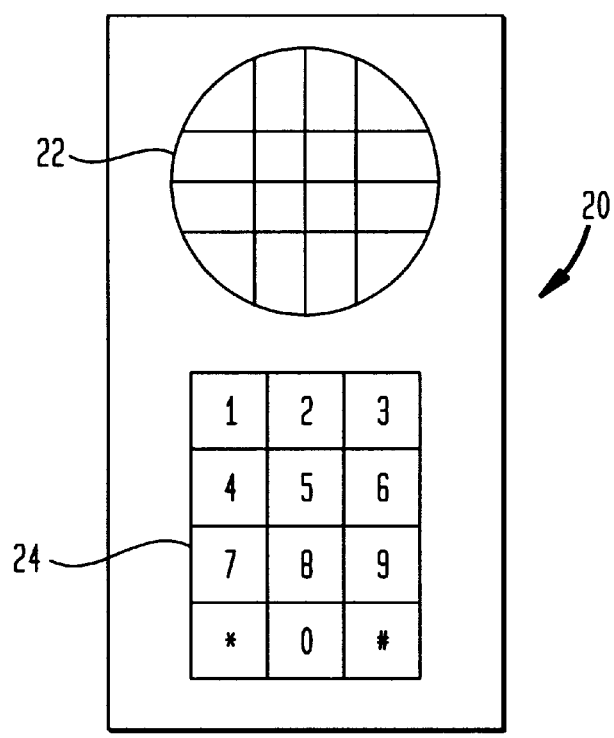
FIG. 2 shows a first example of a pocket dialer in accordance with the present invention.
Figure 3:
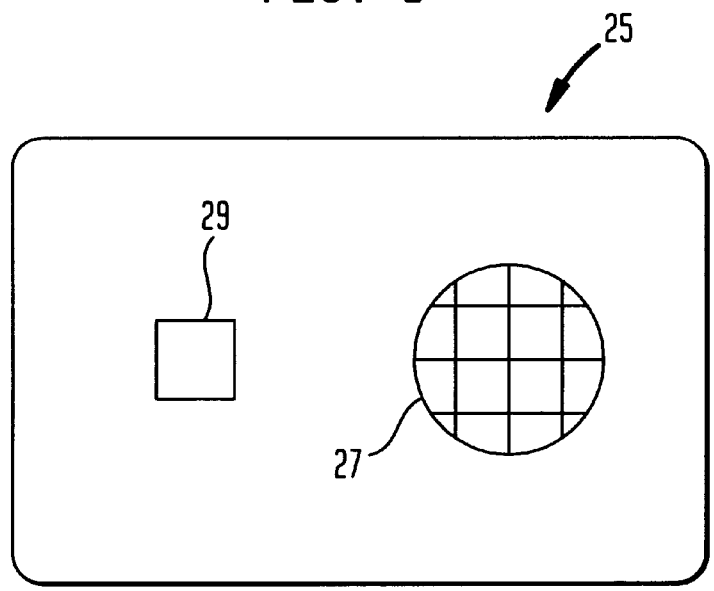
FIG. 3 shows a second example of a pocket dialer in accordance with the present invention.

The operation of FIG. 4 will now be described. The device user inputs his or her telephone number selection and/or voice selection from push-buttons and the like. FIGS. 2 and 3 show some examples of device casings and will be described in greater detail hereinlater. User activation of a push-button or a sequence of push-buttons controls which tone and/or speech equations will be activated in processor 34.

For example, if the desired telephone number is "555–1212" (for directory assistance), the user may depress a preset push-button corresponding to such number. If the name of a party is stored as a speech equation, SEq, in the memory but there is no known telephone number, the user may want that party's name to be output after the directory assistance number is dialed. Thus, the user may depress another push-button (or sequence of buttons) corresponding to the vocalized party name. After the button is depressed to dial the directory assistance number, the address of each tone equation, each representing one tone for each digit, is output from to processor 34 to memory 32 via line 36.

To illustrate, suppose the digit "5" is represented by tone equation TEq5=T4+T2+T5*2+T1+T8. Address signals are sequentially sent to memory 32 to retrieve the data in tone sections T4, T2, T5*2, etc. stored therein. This process occurs for each digit in the telephone number. The retrieved data is supplied to processor 34, via line 38, for output through loudspeaker assembly 40 via amplifier 38 and driving transistor 42.

After the tones to dial the selected telephone number have been outputted, processor 34 then outputs address signals corresponding to the activated speech equations to retrieve the stored speech signal data. This process is essentially similar to the above described retrieval of tone signal data. It should be noted that processor 34 may delay outputting the speech data through loudspeaker assembly 40 for a time sufficient for the telephone connection to be made.

As another example, the user may activate a push-button corresponding to a telephone number to be dialed which simultaneously vocally outputs the name of the corresponding party having the selected telephone number for the user to hear. Thus, the user can verify that he or she is calling the correct party. In this scenario, the depressed button(s) may activate both tone and speech equations in processor 34.

Loudspeaker assembly 40, illustrated as an external drive, includes driving transistor 42 which is supplied with amplified tone and speech data at its base from amplifier 38. A ground Vs is connected to the emitter of the transistor. Speaker 44 with a voltage Vd is connected to the transistor's collector. Besides being an external drive, loudspeaker assembly 40 may also be an internal drive.

Figure 5:
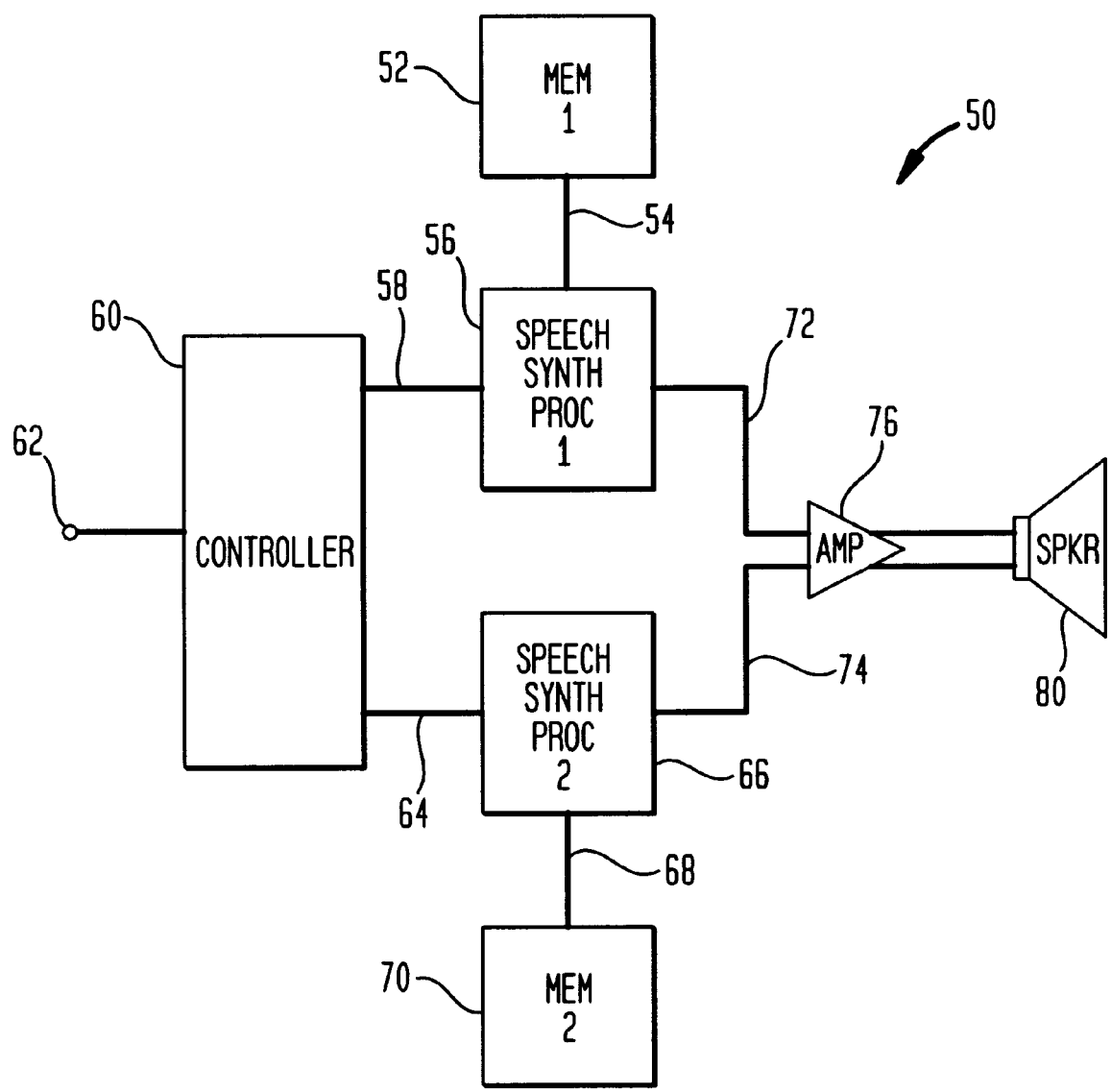
FIG. 5 schematically illustrates a speech and tone synthesizer circuit in accordance with a second embodiment of the present invention.

FIG. 5 schematically illustrates a speech and tone generating device 50 in accordance with a second embodiment of the present invention. Device 50 is similar to the device 30 in FIG. 4, but further includes a second speech synthesizer processor 66 and a second memory 70 in addition to a first speech synthesizer processor 56 and a first memory 52. Of course, first and second speech synthesizers 56, 66 may be connected to a single memory instead of each being connected to a first and second memory, respectively.

An advantage of including an additional processor and optionally an additional memory is that such a configuration will save storage space. Specifically, as stated above with reference to FIG. 4, each tone equation may represent one of twelve DTMF tones. Thus, twelve tone equations must be stored. However, in the embodiment of FIG. 5, only seven (instead of twelve) tones need to be stored. Specifically, the tone of each telephone button on a DTMF keypad corresponds to the frequency tone of a keyboard row superimposed with the frequency tone of a keyboard column. Thus, since there are only four rows and three columns on the telephone keypad, only seven tones are stored, which saves storage space.

For example, suppose the tone for the digit "5" is to be outputted. Since the "5" is located in the second row and in the second column of the telephone keypad, the output of the tone representing row 2 will be combined with the output of the tone representing column 2. In other words, to output the tone for the digit "5", two of seven tones are output, as compared to one of twelve tone equations (as described with reference to FIG. 4) .

The tone equations, TEq, representing the four keypad rows are preferably stored in first processor 56 and the tone section data, TN, for the row tone equations are stored in first memory 52. Similarly, the tone equations representing the three keypad columns are preferably stored in second processor 56 and the tone section data for the column tone equations are stored in second memory 52. To control which processor 56, 66 to activate, a controller 60 is connected to first processor 56 by line 58 and to second processor 66 by line 64. Accordingly, if the device user activates a push-button representing the number "5", a signal from input 62 is supplied to controller 60 for synchronizing the output tone data, representing row 2 and column 2, from the first and second processors, respectively.

With respect to the speech data, such data may also be divided among the first and second processors/memory stores as desired by the programmer. However, the device may preferably store speech data representing both speech and background sound. Accordingly, the background sound data may be stored exclusively in first memory 52, while the speech sound data may be stored exclusively in second memory 70.

The outputted tone and speech signal data from first processor 56 and second processor 66 are supplied to an amplifier 76 via lines 72 and 74, respectively, prior to being outputted through speaker 80. As opposed to external loudspeaker device 40 in FIG. 4, speaker 80 is connected to amplifier 76 by an internal drive system. However, an external drive may be easily implemented, as well.

The operation of FIG. 5 is essentially the same as discussed with reference to FIG. 4, except that data is output from two processors instead of one.

FIGS. 2 and 3 illustrate two dialing device casings that can be used in accordance with the present invention. It is to be understood that numerous other embodiments can also be employed. FIG. 2 shows a hand-held dialer 20 having a speaker cover 22 and push-button keypad 24 representing the DTMF telephone push-button configuration in a conventional telephone. In this embodiment, the user may simply depress the desired prestored telephone number, e.g. by first depressing the "#" button followed by a one or two digit number that represents such selected telephone number. Further, the user may activate a prestored speech synthesized message, e.g. by first depressing the "*" button followed by a one or two digit number that represents such selected message. As discussed above, the name of the party corresponding to the selected telephone number may be vocalized prior to or immediately after the device outputs the tones representing the phone number. Additionally, an LCD display (not shown) can be added to dialer 20 to duplicate the outputted tone and speech data.

FIG. 3 shows a "credit-card" size dialer 25 having a speaker cover 27 and a single pushbutton 29. Dialer 25 may be used for promotional purposes to enable a consumer to easily order the promoted food item, product and the like. For example, dialers 25 can be preprogrammed to dial a specific restaurant and directly order a specific food item. Thus, each dialer 25 can be handed out or mailed to potential customers. Further, dialer 25 may have additional buttons (not shown) which may, when depressed, output tone data representing telephone numbers for different restaurant locations, output speech data representing an entire menu of the restaurant to the user, or output speech data representing the selected one of a plurality of food items to the receiving party.

While several embodiments have been chosen to illustrate the invention, it will be understood by those skilled in the art that various changes and modifications can be made herein without departing from the scope or spirit of the invention as described in the appended claims.

The claimed invention is:

1. A method for generating speech and telephone tone signals in a hand-held device, comprising the steps of:

storing a plurality of speech signal data in a first memory;

selectively retrieving a selected sequence of said speech signal data from said first memory; and synthesizing said speech signal data to generate a real speech signal and a tone signal data for output to a loudspeaker.

2. The method of claim 1, wherein said step of storing in said first memory stores tone signal data representing the four keypad row tones and the three keypad column tones in a Dual Tone Multifrequency (DTMF) push-button telephone.

3. The method of claim 1, further comprising the step of storing an additional plurality of speech and tone signal data in a second memory, wherein said steps of retrieving include selectively retrieving a selected sequence of said speech and tone signal data from said second memory.

4. The method of claim 3, wherein said step of storing in said first memory stores tone signal data representing the four keypad row tones in a Dual Tone Multifrequency (DTMF) push-button telephone, and wherein said step of storing in said second memory stores tone signal data representing the three keypad column tones in said DTMF push-button telephone.

5. The method of claim 4, wherein said step of storing in said first memory stores speech signal data representing background sound, and wherein said step of storing in said second memory stores speech signal data representing speech sound.

6. The method of claim 5, further comprising the step of synchronizing the data selectively retrieved from said first and second memory.

7. The method of claim 6, further comprising the step of amplifying the data outputted from said first and second memory.

8. The method of claim 7, further comprising the step of driving the amplified data to said loudspeaker via a driving transistor.

9. The method of claim 8, wherein said driving transistor, connected to said amplifier, is external to said hand-held device.

10. The method of claim 9, wherein said driving transistor, connected to said amplifier, is positioned internally in said hand-held device.

11. A hand-held device for generating speech and telephone tone signals, comprising:

a first memory for storing predetermined speech and tone sign data; and a first speech processor for selectively retrieving a sequence of said predetermined speech signal data stored in said first memory to generate a real speech signal and a tone signal, for output to a loudspeaker, based on a selected user input.

12. The device of claim 11, further comprising a second speech processor for selectively retrieving a sequence of said predetermined speech and tone signal data stored in said first memory, for output to a loudspeaker, based on a selected user input.

13. The device of claim 12, wherein said first memory stores tone signal data representing the four keypad row tones and the three keypad column tones in a Dual Tone Multifrequency (DTMF) push-button telephone.

14. The device of claim 11, further comprising a second memory for storing additional predetermined speech and tone signal data.

15. The device of claim 14, further comprising a second speech processor for selectively retrieving a sequence of said additional predetermined speech and tone signal data stored in said second memory, for output to a loudspeaker, based on a selected user input.

16. The device of claim 15, wherein said first memory stores tone signal data representing the four keypad row tones in a Dual Tone Multifrequency (DTMF) push-button telephone, and wherein said second memory stores tone signal data representing the three keypad column tones in said DTMF push-button telephone.

17. The device of claim 16, wherein said first memory stores speech signal data representing background sound, and wherein said second memory stores speech signal data representing speech sound.

18. The device of claim 17, further comprising a control circuit for synchronizing the data selectively retrieved from said first and second memory.

19. The device of claim 18, further comprising an amplifier for amplifying the data outputted from said first and second memory.

20. The device of claim 19, further comprising a driving circuit having a driving transistor connected to said amplifier for driving the amplified data to said loudspeaker.

21. The device of claim 20, wherein said driving circuit is external to said hand-held device.

22. The method of claim 21, wherein said driving transistor is positioned internally in said hand-held device.

* * * * *